(12) United States Patent
Young

(10) Patent No.: US 7,815,172 B2
(45) Date of Patent: Oct. 19, 2010

(54) WASTEWATER TREATMENT SYSTEM AND METHOD OF USING SAME

(75) Inventor: Richard Nils Young, Atlanta, GA (US)

(73) Assignee: DBS Manufacturing, Inc., Atlanta, GA (US)

( * ) Notice: Subject to any disclaimer, the term of this patent is extended or adjusted under 35 U.S.C. 154(b) by 0 days.

(21) Appl. No.: 12/502,931

(22) Filed: Jul. 14, 2009

(65) Prior Publication Data

US 2009/0302487 A1 Dec. 10, 2009

Related U.S. Application Data

(63) Continuation of application No. 11/340,976, filed on Jan. 27, 2006, now Pat. No. 7,559,538.

(51) Int. Cl.
*B01F 3/04* (2006.01)

(52) U.S. Cl. .............................. 261/87; 261/88; 261/91; 261/93

(58) Field of Classification Search .................. 261/84, 261/87, 88, 91, 93; 210/747
See application file for complete search history.

(56) References Cited

U.S. PATENT DOCUMENTS

| | | | | | |
|---|---|---|---|---|---|
| 2,783,088 | A | * | 2/1957 | Butler | 239/215 |
| 3,871,581 | A | * | 3/1975 | Dively | 239/16 |
| 3,875,279 | A | * | 4/1975 | Kaelin | 261/91 |
| 7,559,538 | B2 | * | 7/2009 | Young | 261/87 |
| 2005/0142011 | A1 | * | 6/2005 | Tormaschy et al. | 417/423.15 |

* cited by examiner

*Primary Examiner*—Scott Bushey
(74) *Attorney, Agent, or Firm*—Ballard Spahr LLP

(57) ABSTRACT

A wastewater treatment system, comprising a tank and an elongate draft tube. The tank comprises a bottom and at least one partition wall extending short of a tank curved turning wall to form at least a pair of channels for movement of a volume of a liquid. The elongate draft tube is at least partially submerged beneath the liquid and is rotated about its longitudinal axis for orbitally moving the liquid through the at least a pair of channels of the tank in a fixed direction. A process for treating wastewater is also provided.

15 Claims, 14 Drawing Sheets

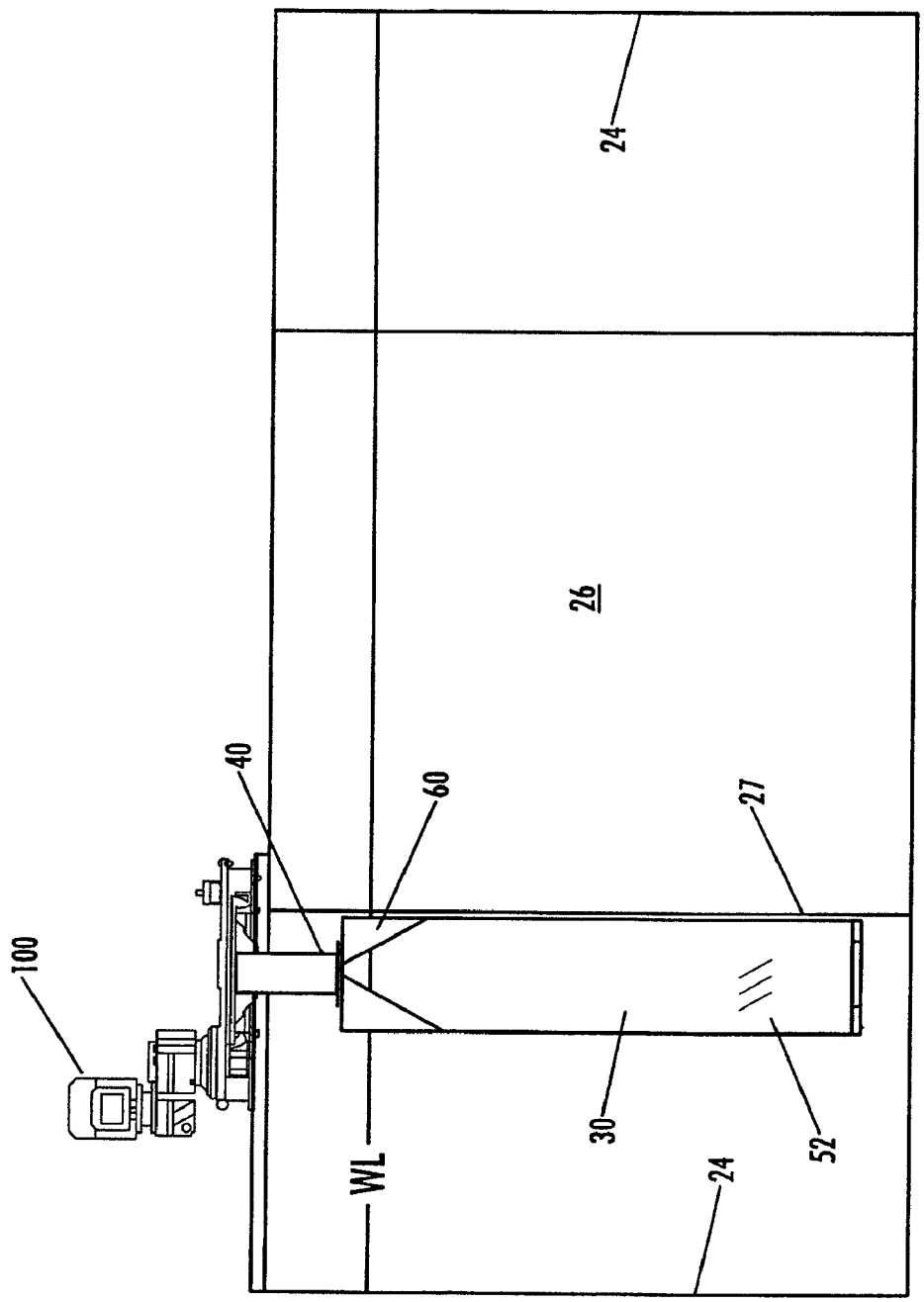

WASTEWATER TREATMENT SYSTEM AND METHOD OF USING SAME

CROSS-REFERENCE TO RELATED APPLICATION

This application is a continuation of and claims priority to and the benefit of U.S. patent application Ser. No. 11/340,976, filed on Jan. 27, 2006, now U.S. Pat. No. 7,559,538 which is incorporated in its entirety in this document by reference.

FIELD OF THE INVENTION

This invention relates to a wastewater treatment system. More particularly, it relates to a system and method in which mixed liquor is subject to treatment in a deep aeration basin and to a system and method in which mixed liquor is subject to treatment while being propelled around an orbital, essentially closed circuit, tank.

BACKGROUND OF THE INVENTION

Presently, low speed aeration rotors are large diameter centrifugal pump rotors that operate horizontally at the air-liquid surface boundary, mixing air and water. In use, the rotor draws water from beneath the rotor and sprays it horizontally over the water surface. The rotor also imparts a rotary motion to the body of water surrounding the rotor. In oxidation ditch applications, the rotary motion imparted by the rotor also forces the water in the ditch to circulate around the ditch. In one example of such a system, U.S. Pat. No. 3,510,110 to Kline, discloses an orbital system employing an elongated tank with central partition that includes a vertically-rotated surface aerator located at the end(s) of the partition wall for both aerating the sewage and circulating the sewage around the channels formed by the partition wall and the sides of the tank.

One example of an orbital system is sold under the trademark Carrousel®. An exemplified Carrousel® system, as with any typical oxidation ditch, has a basin that is shaped like a race track and has a central, longitudinally extending partition wall. The mixed liquor within the ditch is oxygenated by at least one low-speed vertical shaft aerator, which ensures proper mixing while generating the horizontal velocity and turbulence necessary to prevent sludge settling in the circuit. In use, while the wastewater is circulating around the channel, micro-organisms, such as activated sludge, utilize the organic compounds, nitrogen and phosphorus contained in the waste. Depending on how the system is employed, the circulation of the wastewater exposes the activated sludge to oxygen-rich, i.e., aerobic and oxygen-depleted, i.e., anoxic conditions. In use, the low-speed, vertical shaft, turbine aerator provides the necessary oxygen to support biological utilization, while also keeping the biomass in suspension by driving the wastewater in a turbulent flow across the entire looped channel. To obtain the most efficient level of nutrient removal, the power input is adjusted in relation to the actual oxygen demand and load conditions, by varying the speed and/or the submergence of each aerator. When the oxygen demand is low, aeration power can be further reduced by shifting the speed of the aerators, or by switching them off altogether.

The popularity of the conventional orbital systems is due primarily to their relative cost-effectiveness, simplicity of design, ease of operation and maintenance, and excellent effluent quality. The exemplified conventional orbital system can treat raw domestic water to EPA advanced secondary standards without primary clarifiers or effluent filters. With extended aeration, it produces a stable water sludge requiring little or no further processing prior to disposal. The conventional systems can be designed to have a power turn-down to match oxygen input to the mixed liquor to oxygen demand of the microbes acting to degrade the sewage, without loss of mixing and movement.

However, deep oxidation ditches and/or deep aeration basins (for example, and not meant to be limiting, about or greater than 4.5 meters deep) are sometimes beneficial because more matter can be processed in a given amount of surface area. However, the suction effect of conventional rotors is generally limited to about 6 meters in depth, and the rotary motion in oxidation ditches or basins is generally limited to about 4.5 meters in depth. In order to achieve a satisfactory flow velocity in the basins, conventional orbital systems are designed with a maximum depth of about 4.5 meters.

One example of a system for driving fluids below the effective depth limitations of the conventional rotors outlined above is disclosed in U.S. Pat. No. 4,869,818 to DiGregorio, et al. In this system, a radial flow submerged impeller is added to the same shaft that drives the surface aerator so that mixed liquor in the lower portion of the orbital channels is pumped in the same direction as that mixed liquor pumped by the surface aerator. Thus, the system urges movement of the fluid that would have been unaffected by the surface rotor and effectively alleviates certain depth restrictions in orbital tanks, which allows for the use of deeper channels that require less concrete and less land space. However, one will appreciate that adding an additional impeller that extends deep within the basin also requires additional power consumption.

In another example for providing movement of the fluid located near the bottom of aerated basins of greater depth, draft tubes are provided to cooperate with the surface aeration rotor. In this example, the draft tube, which is essentially a large diameter pipe, is fixed to and extends from the bottom of the basin such that its distal end is spaced a distance from the bottom of the basis and its proximal end is positioned below the surface aeration rotor. Here, the draft tube serves to concentrate the pumping action of the surface aeration rotor down toward the bottom of the aerated basin. However, the obstructive bulk of the fixed draft tube greatly attenuates the rotary motion imparted by the rotor, thus making the use of such a fixed draft tube impractical in a standard oxidation ditch and reduces the mixing effect in aerated basins. To overcome this limitation and to allow the use of a draft tube in a deeper ditch/basin system, conventionally practice requires at least one horizontal flow mixer that is positioned within the lower portion of the deeper ditch/basins. The additional required mixer requires more complex machinery and expense as well as increase the power consumption of the system.

From a dynamic point of view, the turbulent energy requirement of a fluid for proper mixing is related to physical properties of the fluid, turbulence length scale created by a particular agitating device and turbulent intensity which has dominant effect on rate of decay of kinetic energy. The turbulent intensity can be interpreted as fluctuating flow velocity and will affect the mass transfer of gas into liquid on gas-liquid interface. An energy efficient aeration method has to incorporate all these factors to produce the best mass transfer mechanism. Balancing of these physical phenomena produces the most energy economical aeration as well as to produce favorable flow configuration for good mixing and solid suspension. Moreover, for practical applications, maximum mechanical simplicity and minimum maintenance in operation are very important factors. The present invention is based on the above considerations.

SUMMARY

In one aspect of the present invention, a wastewater treatment system comprises a tank, which comprises at least a pair of channels for movement of a volume of a liquid, and an elongate draft tube, which is at least partially submerged beneath the liquid. In use, the elongate draft tube is rotated about its longitudinal axis for orbitally moving the liquid through the at least a pair of channels of the tank in a fixed direction. In another aspect, the wastewater treatment system further comprises a rotatable surface aerator that is at least partially immersible into the liquid. In use, the surface aerator is rotated about the longitudinal axis of the draft tube to move the liquid upward and distribute it over the liquid surface.

Related methods of operation are also provided. Other systems, methods, features, and advantages of the wastewater treatment system will be or become apparent to one with skill in the art upon examination of the following figures and detailed description. It is intended that all such additional systems, methods, features, and advantages be included within this description, be within the scope of the wastewater treatment system, and be protected by the accompanying claims.

BRIEF DESCRIPTION OF THE DRAWINGS

The accompanying drawings, which are incorporated in and constitute a part of this specification, illustrate several embodiments of the invention and together with the description, serve to explain the principals of the invention. Moreover, in the figures, like reference numerals designate corresponding parts throughout the different views.

FIG. 8 shows a partial cross-sectional view of a seventh embodiment of the wastewater treatment system of the present invention, showing a rotatable surface aerator connected to a driven shaft and a rotatable draft tube fixedly connected to a bottom portion of the surface aerator, and showing at least one impeller blade mounted to an interior surface of the draft tube for moving liquid up the draft tube toward the surface aerator.

DETAILED DESCRIPTION OF THE INVENTION

Figure 1:
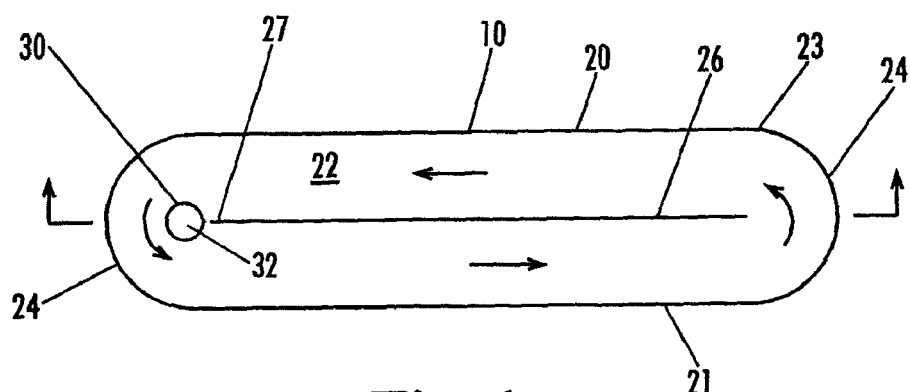
FIG. 1 shows a top elevational view of an embodiment of the wastewater treatment system of the present invention mounted thereon a conventional orbital tank or basin.
Figure 2:
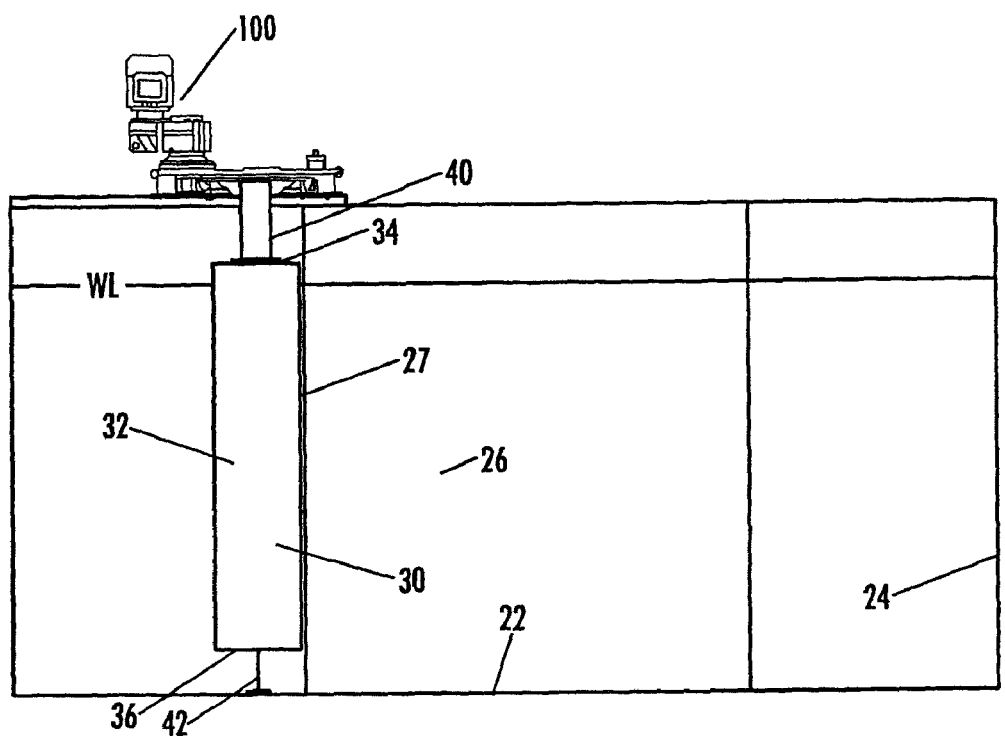
FIG. 2 shows a partial cross-sectional view of a first embodiment of the wastewater treatment system of the present invention, showing a rotatable elongate draft tube mounted proximate an end of a partition wall of the orbital tank, and showing a fixed shaft that extends from the bottom of the tank, which rotatably supports the distal end of the draft tube.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described system, component, event or circumstance may or may not occur, and that the description includes instances where system, component, event or circumstance is included and instances where it is not included.

The present invention may be understood more readily by reference to the following detailed description of preferred embodiments of the invention and the examples included therein and to the Figures and their previous and following description.

In one aspect of the present invention, a wastewater treatment system 10 comprises a tank 20, which comprises at least a pair of channels 21 for movement of a volume of a liquid, and an elongate draft tube 30, which is at least partially submerged beneath the liquid. The tank or basin has a bottom 22 and is configured to hold a predetermined volume of a liquid. In one aspect, the tank 20 or basin of the present invention is a conventional orbital tank. In one example, the orbital tank 20 has a racetrack configuration formed by an outer wall 23, at least a pair of turning walls 24, and at least one partition wall 26. Alternatively, the racetrack configuration can be formed by the outer wall 23, additional turning walls 24, and a series of partition walls 26. In one aspect, an end 27 of the at least one partition wall 26 extends short of a tank curved turning wall to form the at least a pair of channels for movement of the volume of liquid. In one exemplary aspect, the at least a pair of channels extend substantially parallel to each other. Normally, all of the walls of the orbital tank are constructed of concrete. It will be appreciated that the design of the tank or orbital basin 20 is typically based on individual design parameters such as influent quantity and characteristics, desired effluent levels, and the wastewater system's site size and shape.

Conventionally, wastewater can reside within the tank 20 for twelve or more hours and cycle repetitiously around the overall circuit of the tank. In one typical aspect, influent enters the system by pipe and the level of the mixed liquor is controlled by a conventional weir that also functions to remove mixed liquor from the top surface of the system.

In operation, the draft tube 30 is rotated about its longitudinal axis for orbitally moving the liquid through the at least a pair of channels 21 of the tank in a fixed direction. In one aspect, the draft tube 30 provides for propulsion of the mixed liquor in the channels of the tank. As one will appreciate, the rotation of the draft tube induces rotating motion in the surrounding liquid for mixing and moving the liquid in the tank channels. The viscous draft of the rotating exterior surface 32 of the draft tube imparts a significant rotary motion to the liquid surrounding the draft tube 30. Thus, the rotating draft tube 30 has a rotary effect on the liquid as deep as the draft tube extends. In an exemplary example and not meant to be limiting, the draft tube 30 of the present invention could be about 8 feet in diameter and be about 20 feet in height. This exemplary draft tube would impart about 25H.P. into the liquid at normal operative speeds.

In a further aspect, the elongate draft tube is mountable to a first driven rotative shaft 40 and is rotatable about the longitudinal axis of the first driven rotative shaft. In one example, the longitudinal axis of the draft tube is substantially co-axial with the longitudinal axis of the first driven rotative shaft. In one aspect, the longitudinal axis of the draft tube 30 extends substantially parallel to the end 27 of the partition wall 26. In one aspect, the exterior surface 32 of the draft tube is configured to be spaced less that about 36 inches from the end 27 of the partition wall. To this end, the system 10 can be configured to operate with a spacing between the exterior surface 32 of the draft tube and the end 27 of the partition wall of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 and 35 inches and any range derived from these values. Of course it is contemplated that the exterior surface of the draft tube and the end of the partition wall will be substantially parallel to each other such the distance between the exterior surface of the draft tube and the end of the partition wall is substantially constant. Alternatively, the distance between the exterior surface of the draft tube and the end of the partition wall can vary, with the closest distance between respective portions of the exterior surface of the draft tube and the end of the partition wall being within the ranges outlined above.

In another aspect, the distal end 34 of the draft tube is positioned a predetermined distance from the bottom 22 of the tank. In one example, the distal end of the draft tube is spaced from the bottom of the tank a distance less than or equal to the diameter of the opening defined in the distal end of the draft tube. Alternatively, the predetermined distance can be less than or equal to about ¾ of the diameter of the opening defined in the distal end of the draft tube. In another example, the predetermined distance can be less than or equal to the radius of the opening defined in the distal end of the draft tube. Of course, it is contemplated that the predetermined distance can be greater than or equal to the diameter of the opening defined in the distal end of the draft tube.

In a further aspect, the wastewater system 10 can further comprise a fixed axial support shaft 42 mounted to and extending therefrom the bottom 22 of tank. The system can further comprise a bearing means for rotatively supporting the distal end 34 of the draft tube. In this aspect, the distal end of the draft tube is rotatively supported such that the draft tube will not oscillate about it longitudinal axis. In operation, the rotative shaft 40 and the fixed support shaft 42 cooperate to allow for the rotation of the draft tube about its longitudinal axis.

In a further aspect of the system, the diameter of the proximal end 36 of the draft tube 30 is greater than the diameter of the distal end 34 of the draft tube 30. By having a reduced inlet diameter at the distal end 34 of the draft tube, fluid is pumped from the distal end 34 of the draft tube toward the proximal end 36 as the draft tube is rotated about its longitudinal axis. In one aspect, the diameter of the draft tube increases as the draft tube extends from the distal end towards the proximal end. It is believed that the pumping action may be a result of centrifugal force, due to the rotation of the draft tube, acting on the liquid against the draft tube's inner diameter. The liquid can then equally flow up or down the draft tube 30 to leave the high pressure area. By having the diameter of the proximal end 36 of the draft tube being greater than the diameter of the distal end 34 of the draft tube, the liquid is urged or directed toward the area of increasing inside diameter.

In a further exemplary aspect, the draft tube 30 may further comprise an insert 37 that is mountable in a distal end portion of the draft tube. In this example, the insert 37 defines a central opening 38 that has a diameter that is less than the inside diameter of the proximal end 36 of the draft tube. Thus, in one aspect, the insert can be a substantially planar ring shaped member that is mountable to the distal end 34 of the draft tube, or alternatively, that is mountable to the interior surface 33 of the draft tube 30 within a distal end portion of the draft tube.

In one example, the draft tube 30 can be substantially cylindrical. By partially enclosing the distal end of a cylindrical draft tube 30, such as by use of the insert 37, the fluid can be pumped from the distal end 34 toward the proximal end 36 of the draft tube.

In another aspect, the draft tube 30 has a frustoconical shape in which the diameter of the proximal end of the draft tube is greater than the diameter of the distal end of the draft tube. In this aspect, the insert 37 can, if desired, be mounted to a distal end portion of the draft tube.

Figure 3:
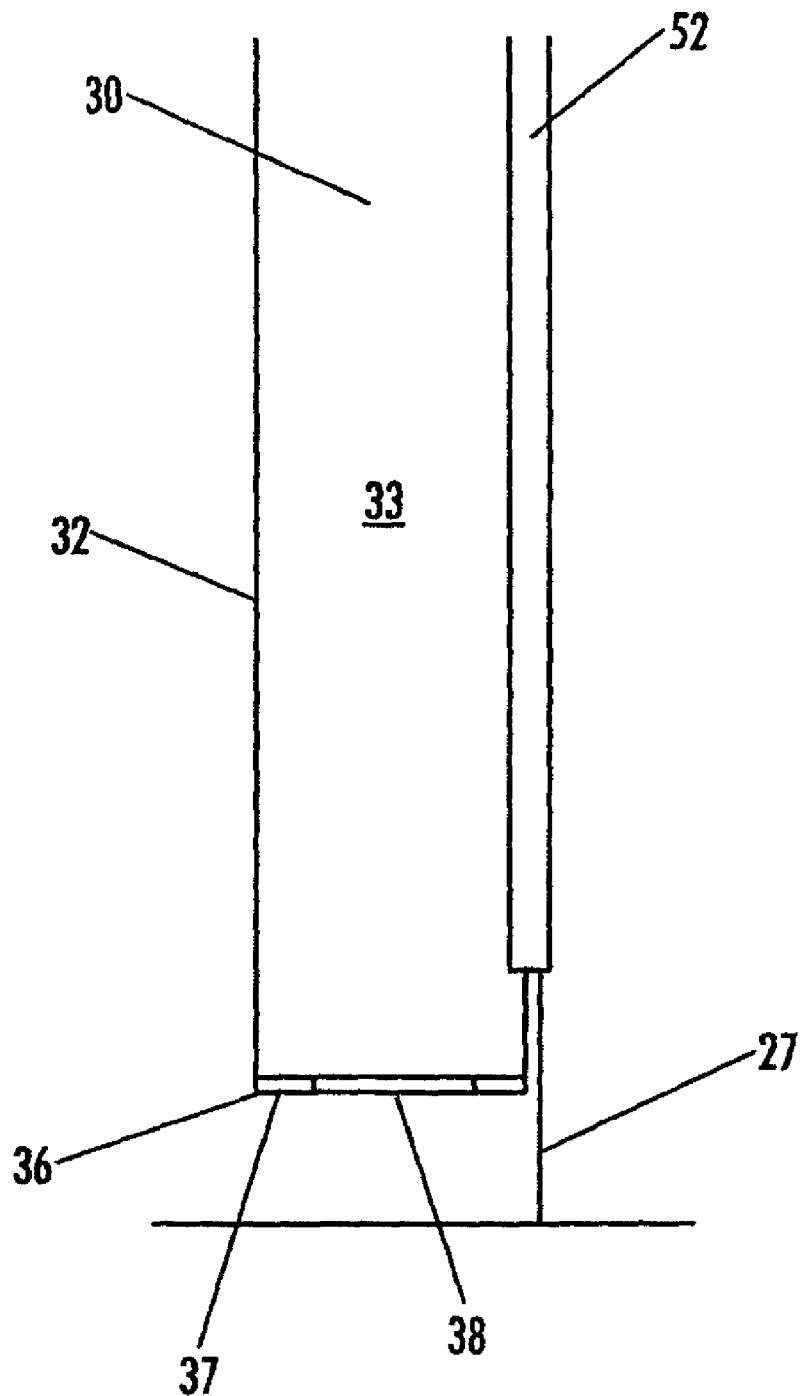
FIG. 3 shows an enlarged partial cross-sectional view of a cylindrical draft tube, showing an insert mounted in a distal end of the draft tube such the effective inside diameter of the distal end of the draft tube is less than the effective inside diameter of the proximal end of the draft tube, and showing a blade mounted proximate an end portion of a partition wall.
Figure 4:
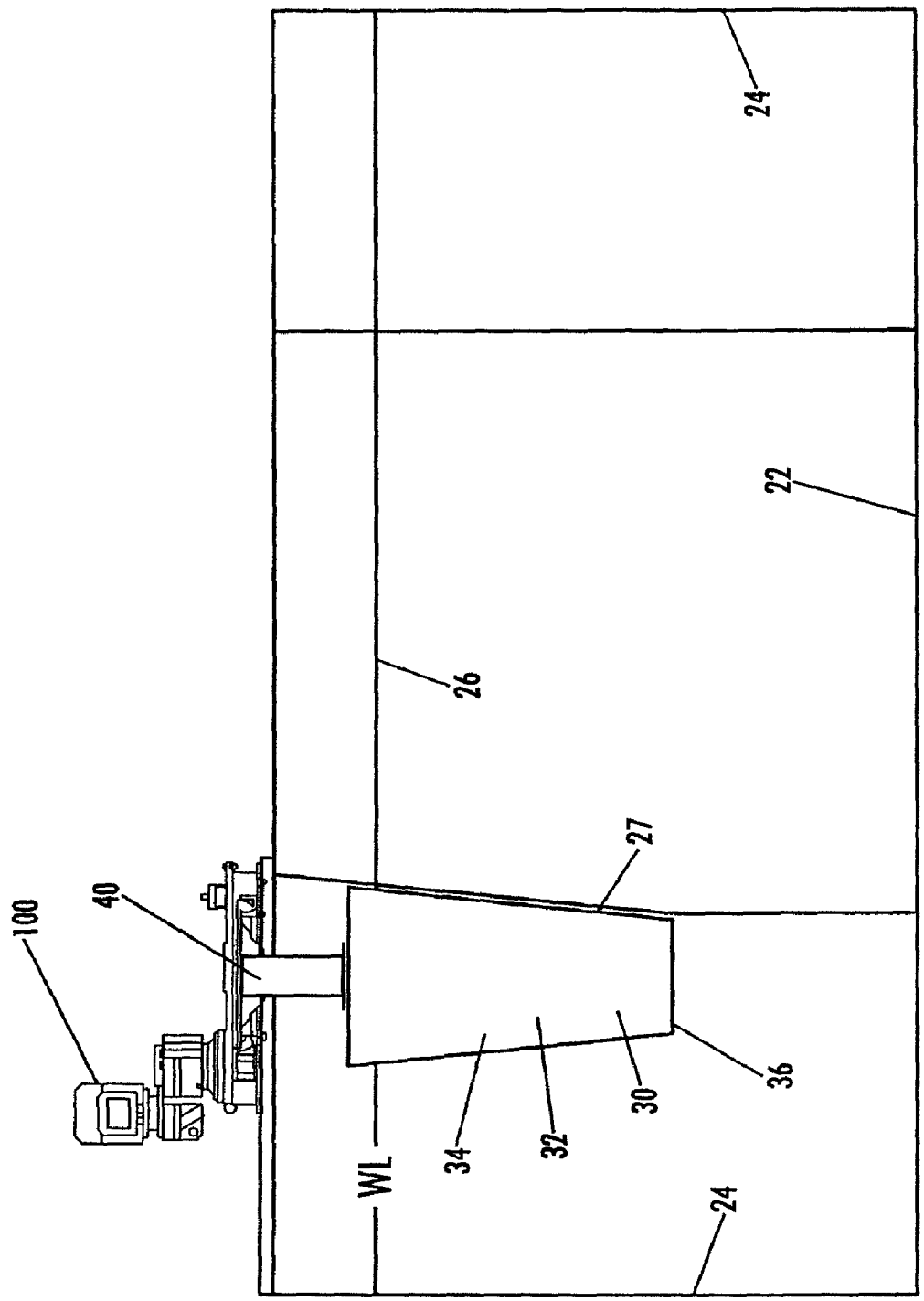
FIG. 4 shows a partial cross-sectional view of a second embodiment of the wastewater treatment system of the present invention, showing a tapered rotatable draft tube mounted proximate an end of a partition wall of the orbital tank, wherein the effective inside diameter of the distal end of the tapered draft tube is less than the effective inside diameter of the proximal end of the draft tube.
Figure 5:
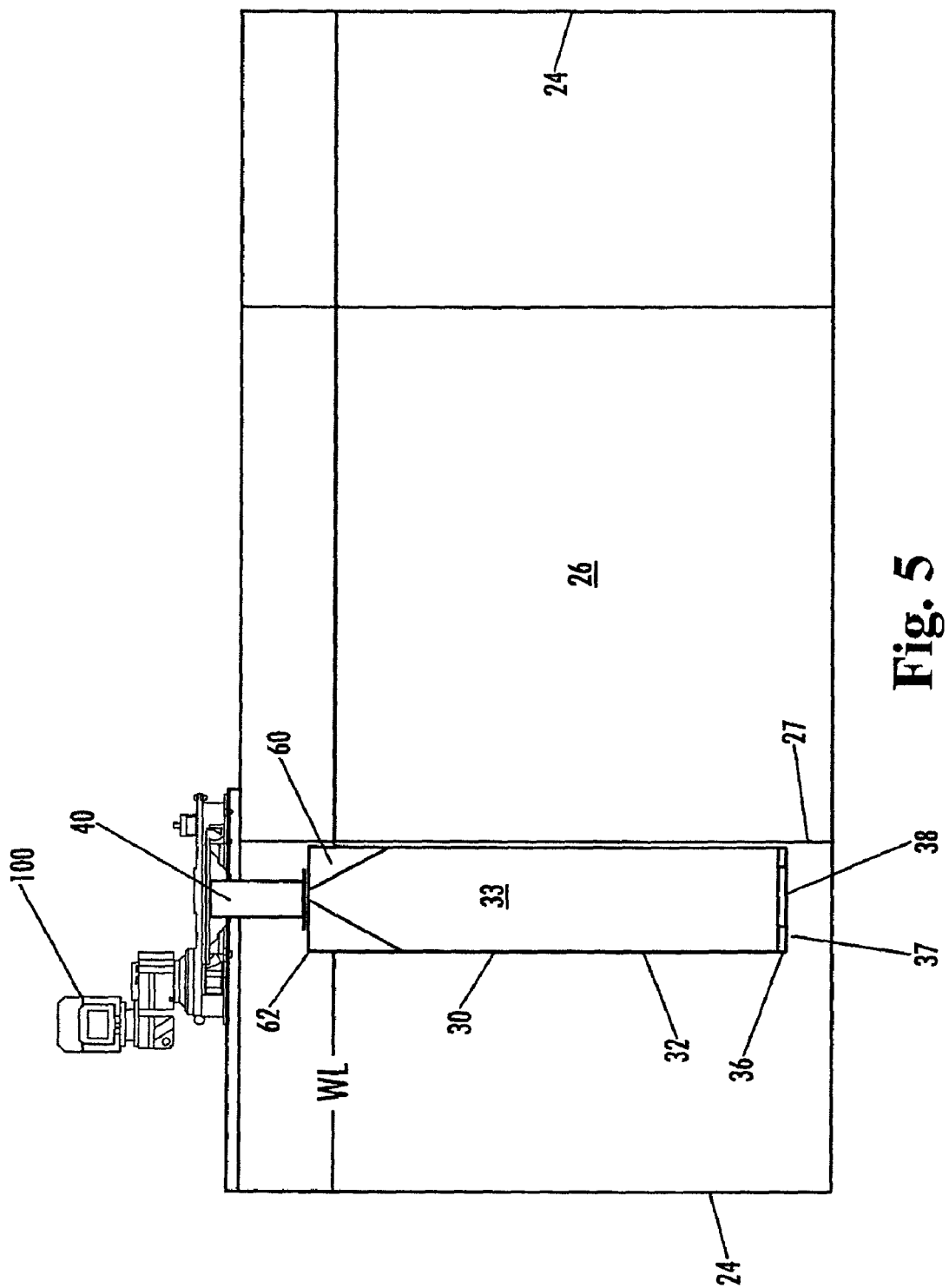
FIG. 5 shows a partial cross-sectional view of a third embodiment of the wastewater treatment system of the present invention, showing a rotatable surface aerator connected to a driven shaft and showing a rotatable elongate draft tube fixedly connected to a bottom portion of the surface aerator.

In a further aspect and referring to FIG. 3, the wastewater system 10 may comprise a flexible blade 50 mounted to at least a portion of the end 27 of the partition wall 26. In operation, at least a portion of the flexible blade is in slideable contact with a portion of the exterior surface 32 of the rotating draft tube.

Figure 9:
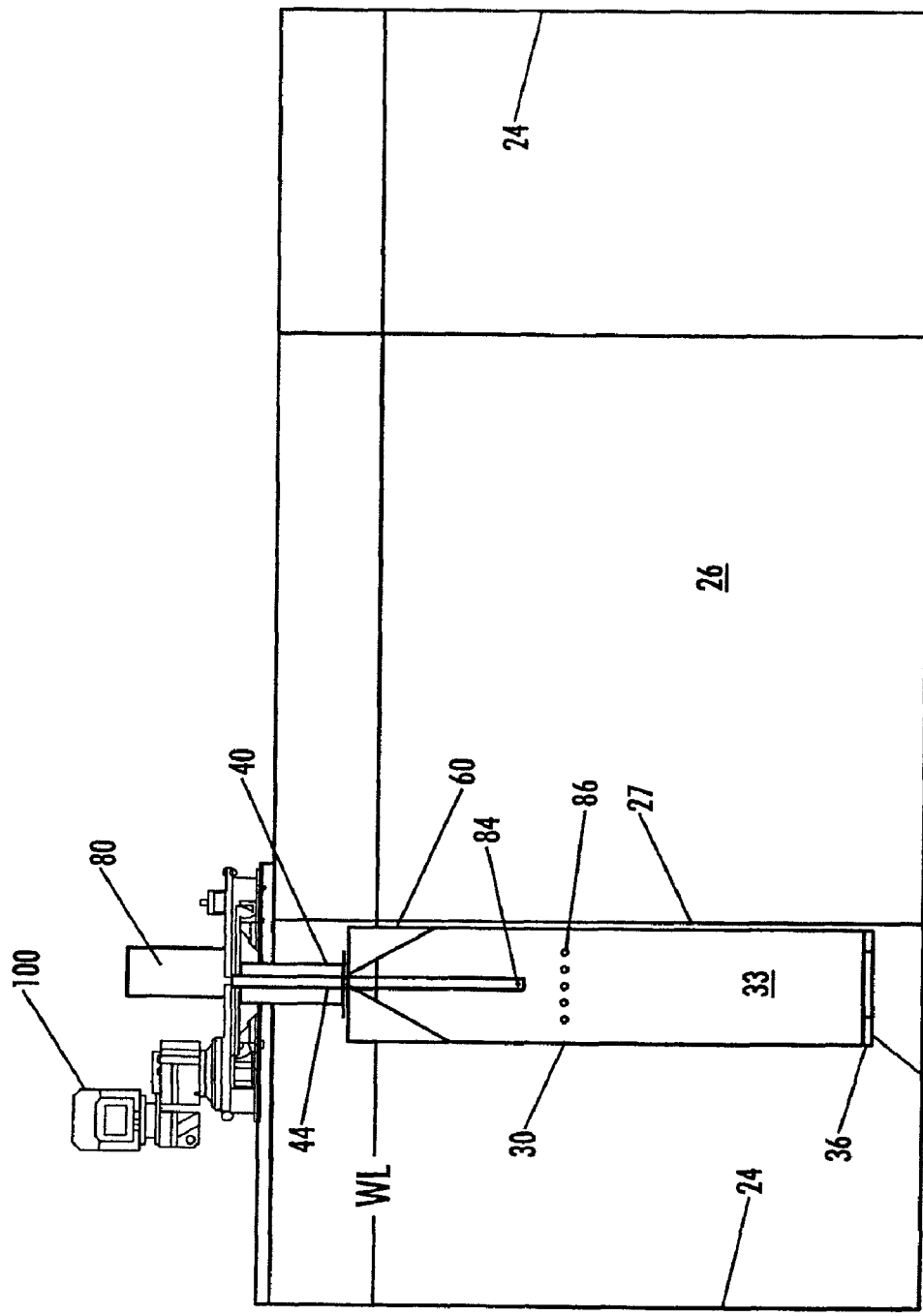
FIG. 9 shows a partial cross-sectional view of a eighth embodiment of the wastewater treatment system of the present invention, showing a rotatable surface aerator connected to a driven shaft and a rotatable draft tube fixedly connected to a bottom portion of the surface aerator, and showing a source a gas in communication with the interior and exterior of the draft tube.

In another aspect of the invention and referring to FIG. 9, the wastewater system 10 can further comprise a plurality of impeller blades 52 mountable to the interior surface 33 of the draft tube. Each impeller blade 52 is configured to move liquid up the draft tube toward the proximal end 36 of the draft tube 30 as the draft tube is rotated. In the exemplary example outlined above, for a draft tube 30 having dimensions of about 8 feet in diameter and about 20 feet in height, the addition of 4 inch by 1 inch wide blades vertically up the exemplary 20 foot draft tube would increase the power transmitted into the liquid at normal operating speeds by approximately 146H.P.

In a further aspect, the wastewater treatment system 10 further comprises a rotatable surface aerator 60 that is at least partially immersible into the liquid. In use, the surface aerator 60 is rotated about its longitudinal axis to move the liquid upward and distribute it over the liquid surface. The aerator 60 acts to provide mixed liquor mixing, aeration of the mixed liquor of waste water and activated sludge, and aid in the flow of the mixed liquor through the channels of the tank.

In one embodiment of the present invention, the rotatable surface aerator 60 is mounted to a portion of the first driven rotative shaft 40. In one aspect, as noted above, the rotatable surface aerator 60 is at least partially immersible into the liquid and is adapted to rotate about the longitudinal axis of the first driven rotative shaft 40 to move the liquid upward and distribute it over the liquid surface. In one example of the system 10, at least a portion of the rotative shaft 40 extends into the liquid contained therein the tank. In alternative aspects, it is contemplated that the rotative shaft 40 is mounted to an upper portion 62 of the surface aerator 60 and does not extend into the liquid contained in the tank.

In one aspect, the proximal end 36 of the draft tube 30 underlies the surface aeration rotor 60. In a further aspect, the diameter of the surface aerator 60 is at least equal to the diameter of the proximal end 36 of the draft tube. The larger diameter of the surface aerator 60 relative to the inside diameter of the proximal end 36 of the draft tube 30 allows for a lower rotation speed to achieve the desire discharge water velocity of about 10 to 25 feet per second. In another aspect, the larger diameter of the surface aerator 60 relative to the inside diameter of the proximal end of the draft tube 30 allows for the discharged liquid to accelerate more slowly as it moves from the inside diameter of the proximal end of the draft tube to the larger outside diameter of the surface aerator. This allows for a reduction is power required to achieve the desired discharge velocity. To this end, the system can be configured to operate with a desired discharge velocity of 11, 12, 13, 14, 15, 16, 17, 18, 19, 20, 21, 22, 23, 24 and any range derived from these values. It is, of course, contemplated that the diameter of the surface aerator 60 can be less than the diameter of the proximal end 36 of the draft tube 39.

Figure 6:
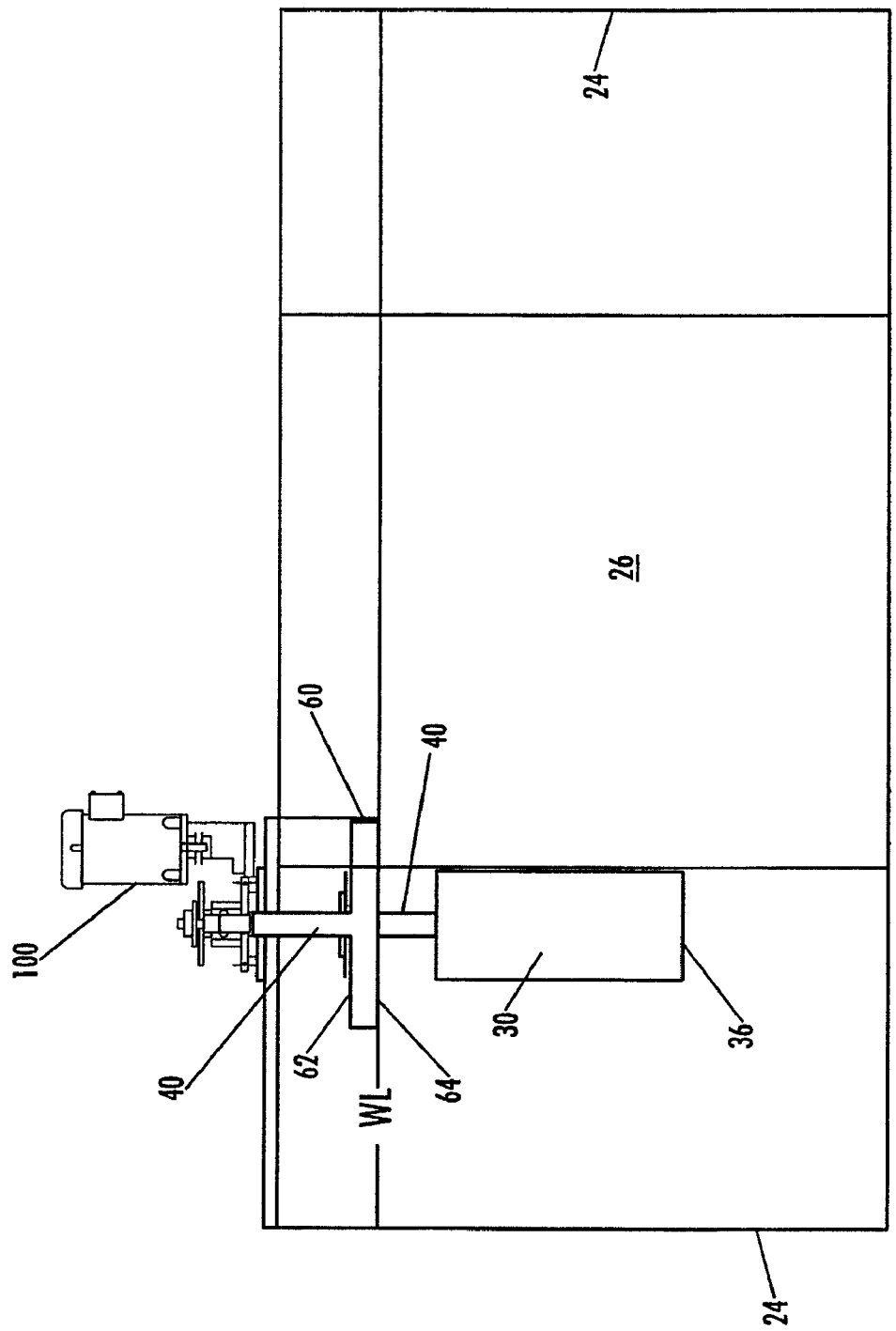
FIG. 6 shows a partial cross-sectional view of a fourth embodiment of the wastewater treatment system of the present invention, showing a rotatable surface aerator connected to a driven shaft and showing a rotatable draft tube connected to the driven shaft and spaced a predetermined distance from a bottom portion of the surface aerator.

It another aspect of the invention, the proximal end 36 of the draft tube is positioned adjacent to a bottom portion 64 of the surface aerator. In one example of this aspect, the proximal end of the draft tube is connected directly to the bottom portion of the surface aerator. In this exemplary aspect, the length of the draft tube would be submerged. Alternatively, and as shown in FIG. 6, it is contemplated that the proximal end 36 of the draft tube is spaced a predetermined distance from the bottom portion 64 of the surface aerator 60. In this exemplary aspect, the length of the draft tube would be submerged.

The combination of the rotating surface aerator 60 and the underlying rotating draft tube 30 focuses the suction effect of the aerator deep in the tank. The allows for the construction of very deep oxidations ditches since the imparted rotary motion to the liquid contained within the tank would be substantially uniform from the top of the tank down to the distal end of the rotating draft tube.

It is contemplated that the aeration efficiency of the rotor and draft assembly would be greater than the surface aerator alone. In the wastewater treatment system of the present invention, liquid flows up through the draft tube from its distal end to its proximal end and exits through the surface aerator to be sprayed into the air at the liquid surface. This is in contrast to conventional surface rotors that pump a portion of their water below the surface and not into the air.

Figure 7A:
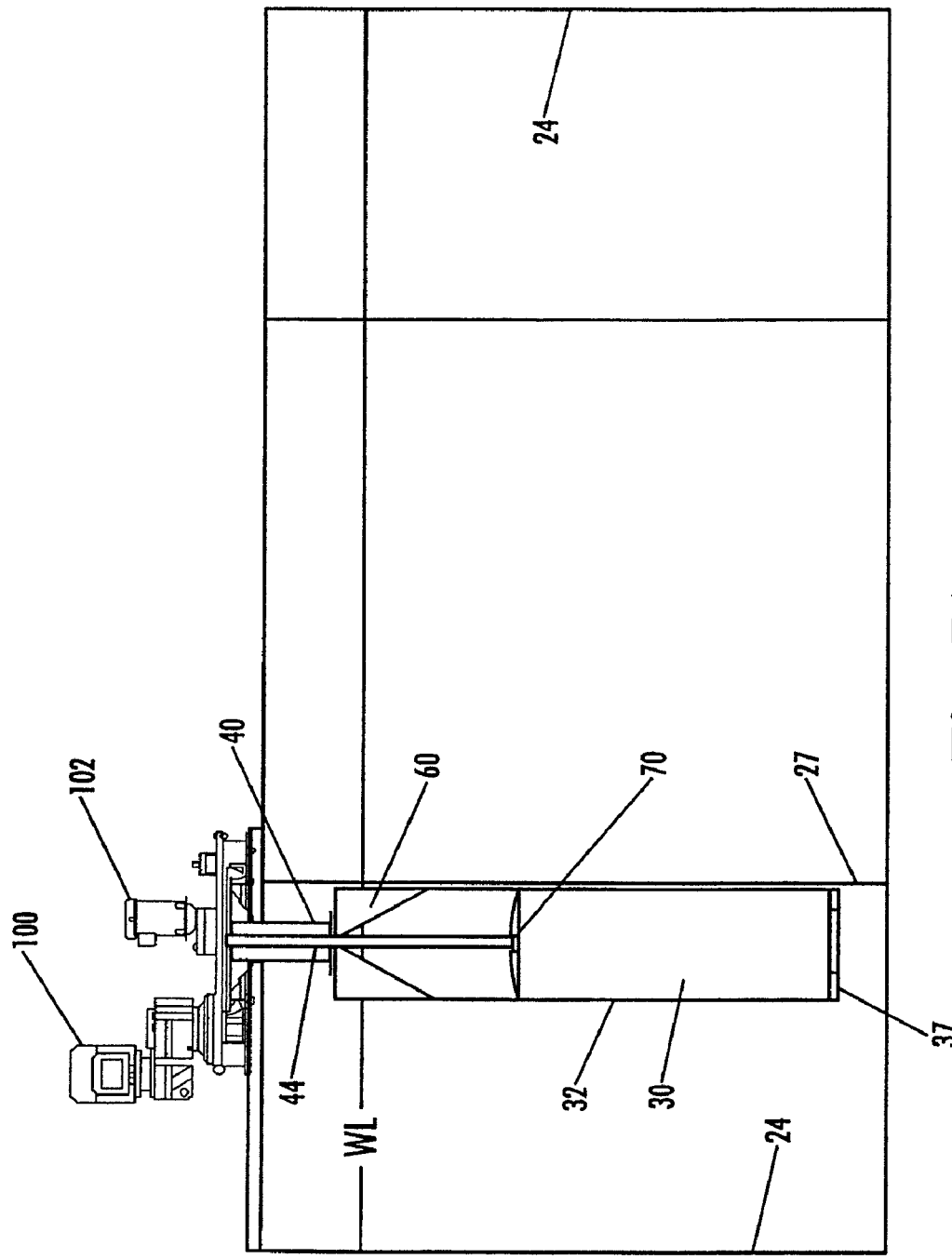
FIG. 7A shows a partial cross-sectional view of a fifth embodiment of the wastewater treatment system of the present invention, showing a rotatable surface aerator connected to a first driven shaft and a rotatable draft tube fixedly connected to a bottom portion of the surface aerator, and showing a rotatable submerged rotor or high efficiency turbine impeller mounted to a second driven shaft and positioned therein the interior of the draft tube for moving liquid up the draft tube toward the surface aerator.
Figure 7B:
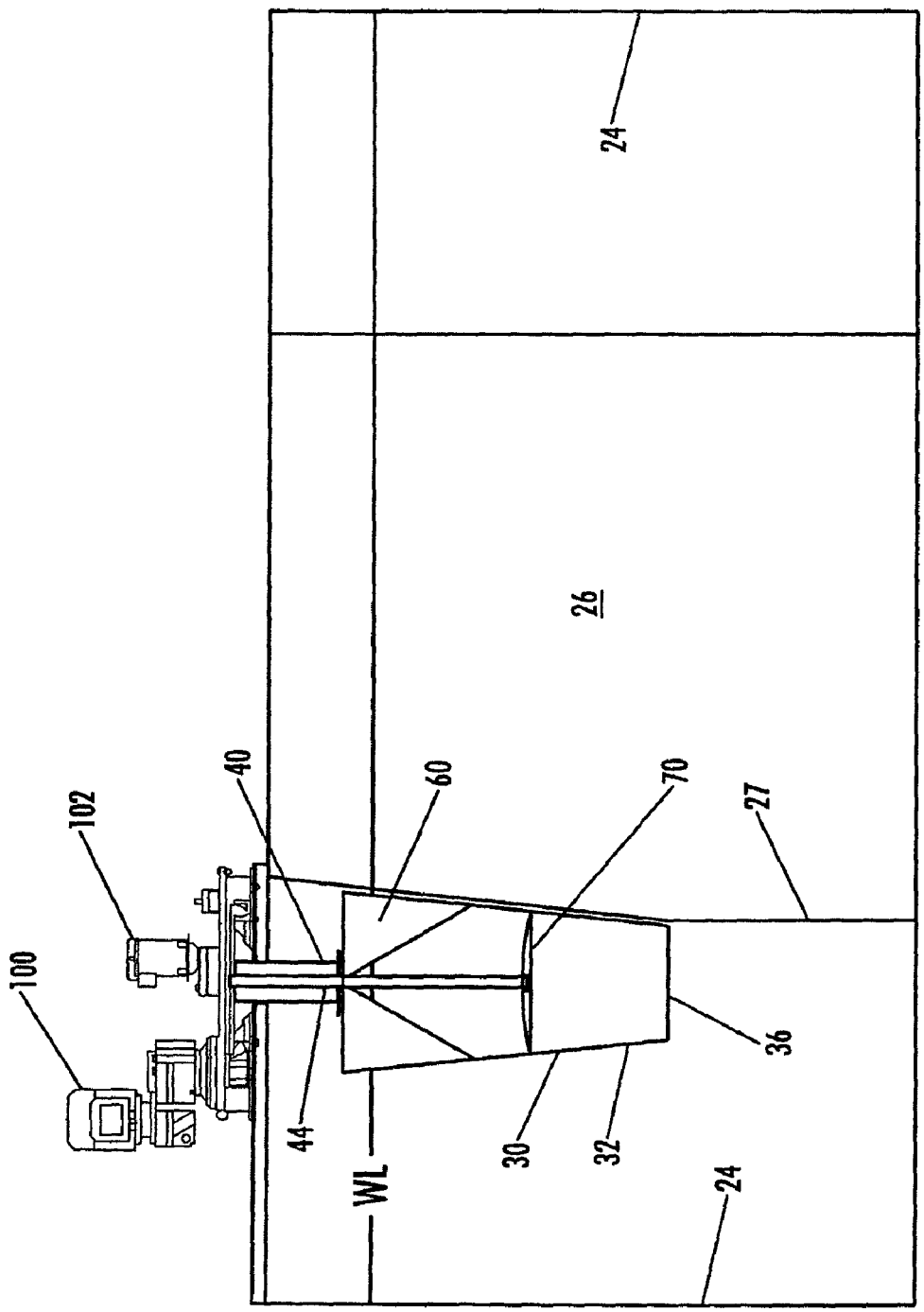
FIG. 7B shows a partial cross-sectional view of a sixth embodiment of the wastewater treatment system of the present invention, showing a rotatable surface aerator connected to a first driven shaft and a tapered rotatable draft tube fixedly connected to a bottom portion of the surface aerator, and showing a rotatable submerged rotor or high efficiency turbine impeller mounted to a second driven shaft and positioned therein the interior of the draft tube for moving liquid up the draft tube toward the surface aerator.

In a further aspect, and referring to FIGS. 7A and 7B, the wastewater treatment system further comprises a second driven rotative shaft 44 and a submerged rotor 70 that is mounted to the second driven shaft 44 and that acts as an axial flow impeller. In this aspect, the second driven rotative shaft 44 has a longitudinal axis and is positioned within at least a portion of the draft tube 30. In one exemplary aspect, the first rotative shaft 40 is hollow and the second rotative shaft 44 extends through the hollow of the first rotative shaft. In this aspect, it is contemplated that the first rotative shaft 40 can be connected to the upper portion 62 of the surface aerator 60 and the draft tube 30 would be connected to the bottom portion 64 of the surface aerator.

In one aspect, the submerged rotor 70 is mounted to the second driven rotative shaft 44 within the interior volume of the draft tube 30 and is conventional configured to move liquid up the draft tube toward the surface aerator. In one aspect, the second driven rotative shaft 44 is rotated in the same direction as the draft tube at a speed at least equal to the rotation speed of the first driven rotative shaft (i.e., the rotative speed of the draft tube). For example, the second driven rotative shaft 44 can be rotated at a multiplier about and between 1.1 to about 3.0 of the speed of the first rotative shaft 40. Having a separate drive 102 for the second rotative shaft 44 permits regulation of the amount of liquid that is pumped up the draft tube.

It is contemplated, in one embodiment of the invention, that the respective rotations of the surface aerator 60 and the connected draft tube 30 and the internal, submerged rotor 70 be separately controlled so that the power to rotate or mix the liquid can be adjusted by changing the draft tube rotation speed. In this aspect, the amount of oxygen inducted into the water can be controlled by changing the speed of the axial flow impeller 70. Of course, it is further contemplated that, in sizing the system for the specific application, the relative sizes of the surface aerator 60 and the connected draft tube 30 and the submerged rotor 70 can be selected to put more or less power to mixing or aeration as required by the desired application process demands.

In an alternative aspect, the, the second driven rotative shaft 44 is rotated in the opposite direction as the draft tube 30 at a select speed or is non-rotative with respect to the draft tube 30. In this alternative aspect, and as one skilled in the art will appreciate, the pitch of the submerged rotor 70 is generally opposite to the pitch of the submerged rotor that rotates in the same direction as the draft tube. Here, the rotor 70 uses or recovers the power in the water being rotated by viscous drag inside the moving draft tube 30.

Referring to FIG. 9, the wastewater treatment system of the present invention can also comprise a source of gas 80 that is in communication with a portion of the system to supplement the amount of gas that is supplied to the system. The source of gas acts to increase the efficiency of the system. In one aspect, in which the lower portion of the first driven rotative shaft is positioned within the draft tube, the first driven rotative shaft 42 defines a bore 82 in communication with at least one aperture 84 in the lower portion of the first driven rotative shaft. The bore is in communication with the source of gas such that the gas can be selectively injected into the fluid within the draft tube via the at least one aperture 84.

In another aspect, the draft tube 30 defines at least one aperture 86 that is in communication with the source of gas 80 for selectively injecting gas into the fluid proximate the at least one aperture. In one aspect, it is contemplated that the at least one aperture 86 can be positioned on an interior surface 33 of the draft tube. In another aspect, the at least one aperture 86 can be positioned on an exterior surface 32 of the draft tube. In a further aspect the at least one aperture 86 can be positioned on respective select portions of both the interior and exterior surfaces of the draft tube. Further, it is contemplated that the at least one aperture 86 can be positioned on any select portion of the upper or lower portions of the draft tube 30.

In another aspect of the invention, the wastewater treatment system 10 can further comprise a drive unit 100 that is positioned above the liquid surface of the volume of liquid. In one aspect, the drive unit 100 is positioned between the end 27 of one of the at least one partition walls 26 and the tank curved turning wall 24. In one aspect, the drive unit 100 is operatively coupled to the first driven rotative shaft.

In an exemplary example of the operation of the system of the present invention, the submerged elongate draft tube is rotated to orbitally move the liquid through the at least a pair of channels of the tank in a fixed direction. As the draft tube is rotated, liquid is continuously drawn into the distal end of the draft tube and is propelled toward the proximal end of the draft tube. As noted above, if the system further comprises a rotating surface aerator, the rotation of the surface aerator acts to aerate the liquid and to move at least an upper portion of the liquid within the tank. In one aspect, by positioning the draft tube underneath the bottom portion of the surface aerator and rotating the surface aerator and draft tube about a common longitudinal axis, liquid is continuously drawn into the distal end of the draft tube, through the proximal end of the draft tube, and is directed toward the bottom portion of the surface aerator by the pumping action of the surface aerator.

EXAMPLES

To further illustrate the principles of the present invention, the following examples and experimental data are put forth so as to provide those of ordinary skill in the art with a complete disclosure and description of how the devices, systems and methods claimed herein can be made and evaluated. They are intended to be purely exemplary of the invention and are not intended to limit the scope of what the inventors regard as their invention. Efforts have been made to ensure accuracy with respect to numbers (e.g., SOTR, average velocities, etc.); however, some errors and deviations may have occurred.

Tests were conducted of 1/10 scale models of the system of the present invention and an exemplary DHV/Eimco aerator with a lower mixer. The exemplary DHV/Eimco aerator with a lower mixer is of a type previously exemplified in the U.S. Pat. No. 4,869,818 to DiGregorio, et al, in which a radial flow submerged impeller is added to the same shaft that drives the surface aerator so that mixed liquor in the lower portion of the orbital channels is pumped in the same direction as that mixed liquor pumped by the surface aerator. The scaled model of the system of the present invention comprised a draft tube co-axially mounted to a bottom portion of a surface aerator, which extended to near the test basin floor. In both scale models that were tested, a similar low speed surface aerator was used. The model orbital tank size was 4' wide by 8' long by 4' deep, with 24 inch wide channels.

Figure 10:
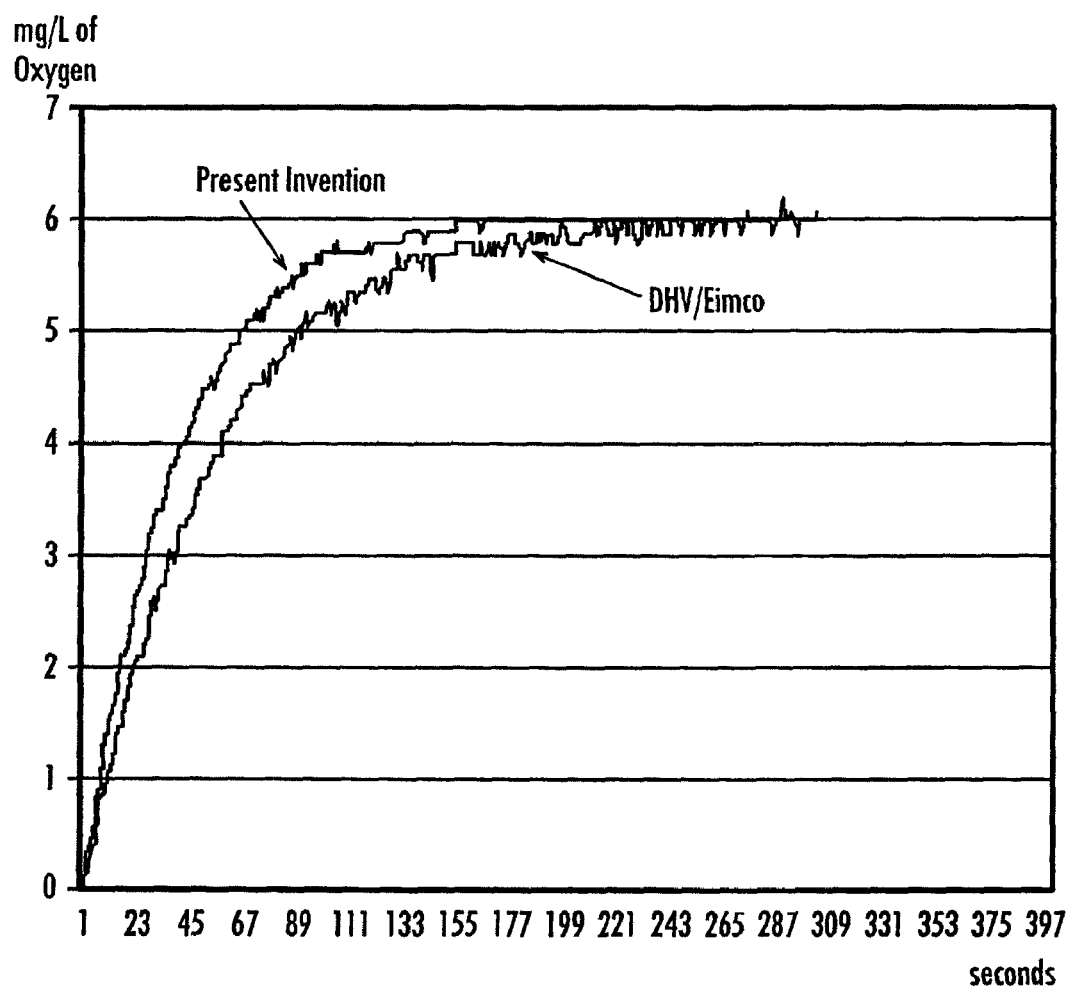
FIG. 10 is a chart that illustrates the time for comparative scaled models of aeration devices to completely aerate water in a test tank.
Figure 11A:
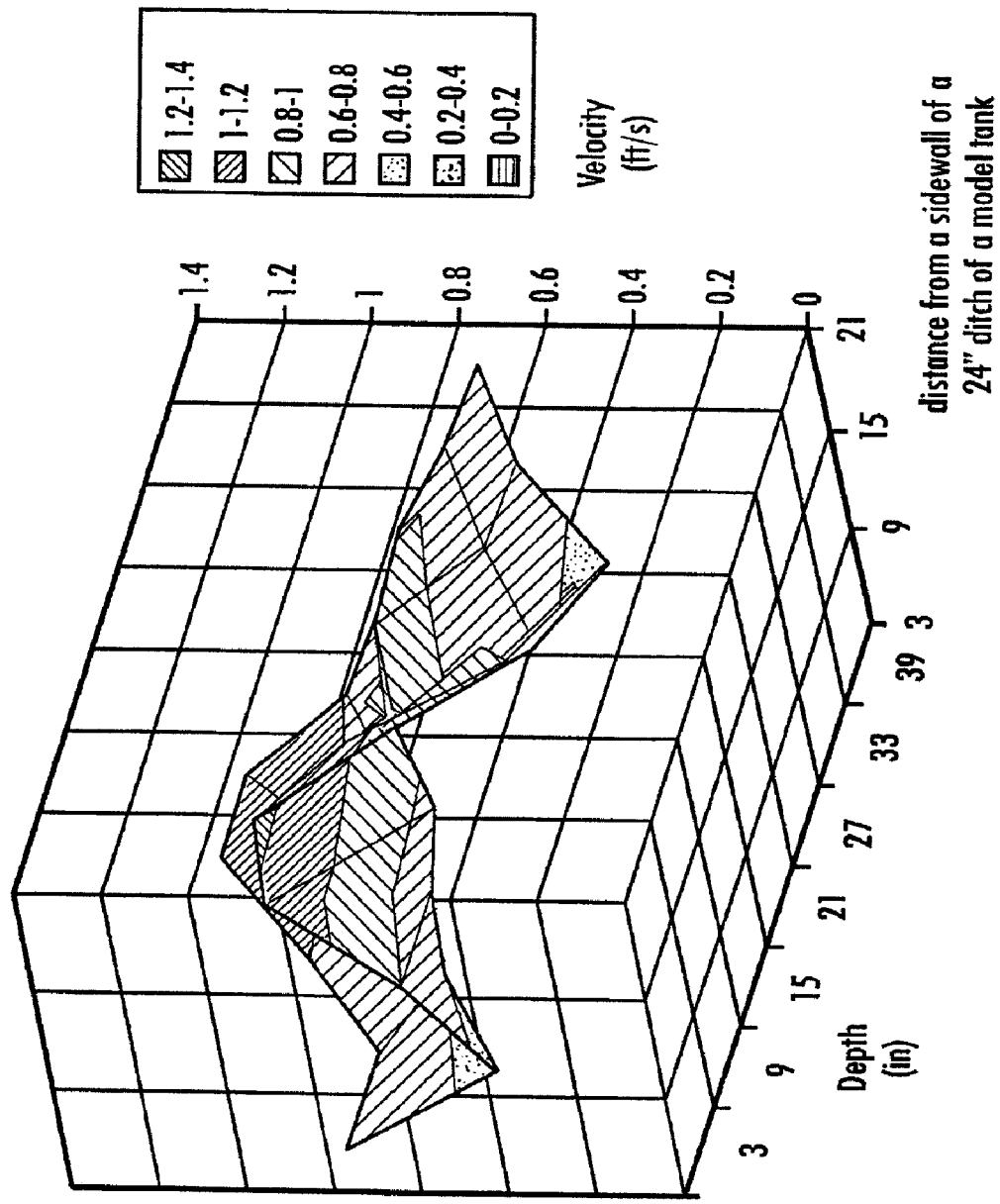
FIGS. 11A and 11B are charts that illustrate test velocity profiles of a scaled embodiment of the present invention having a rotatable surface aerator connected to a driven shaft and a rotatable draft tube fixedly connected to a bottom portion of the surface aerator. The distance from the wall is the distance from a sidewall of a model orbital tank having a 24 inch wide channel with a water depth of 42 inches.
Figure 11B:
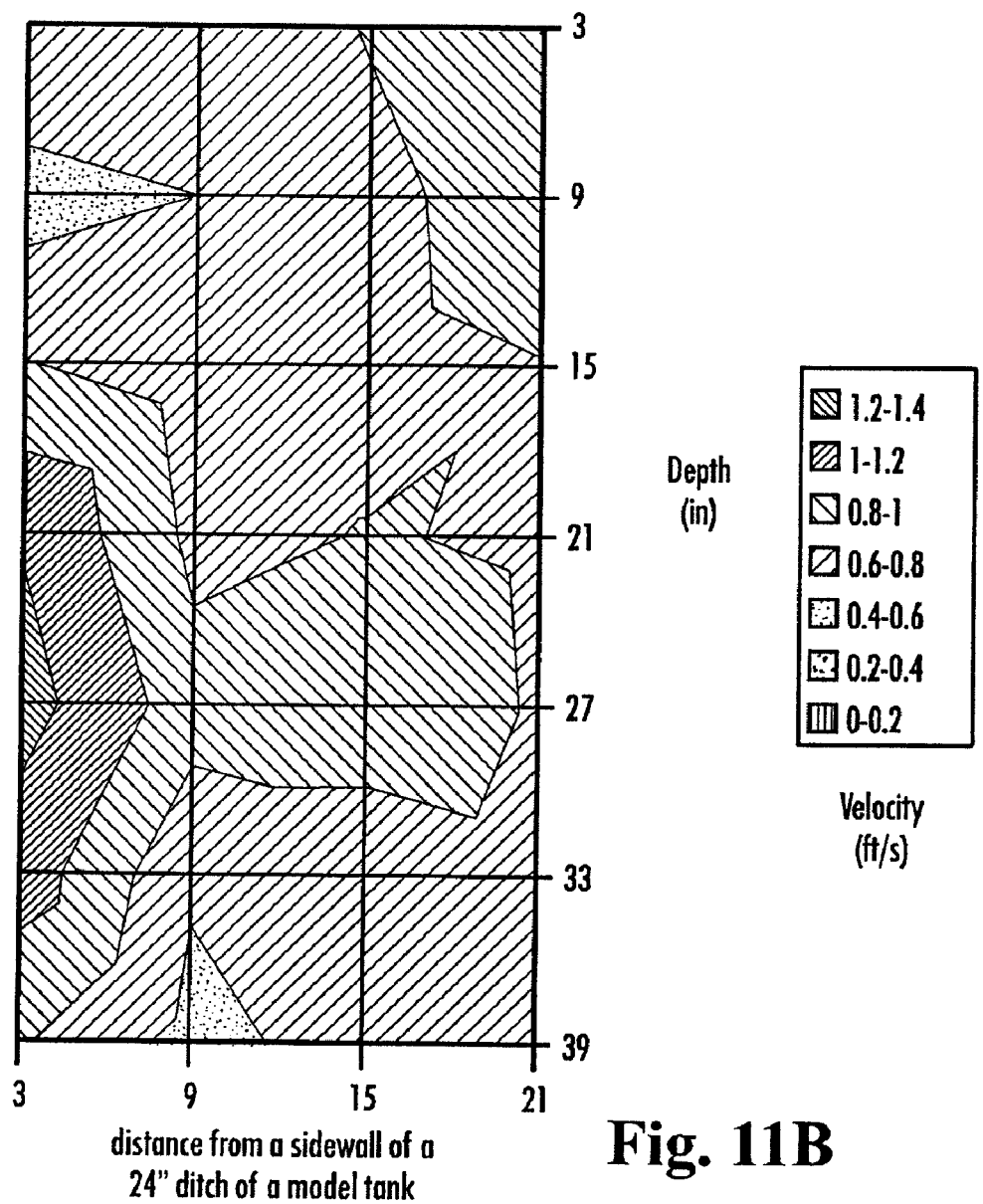
Figure 12A:
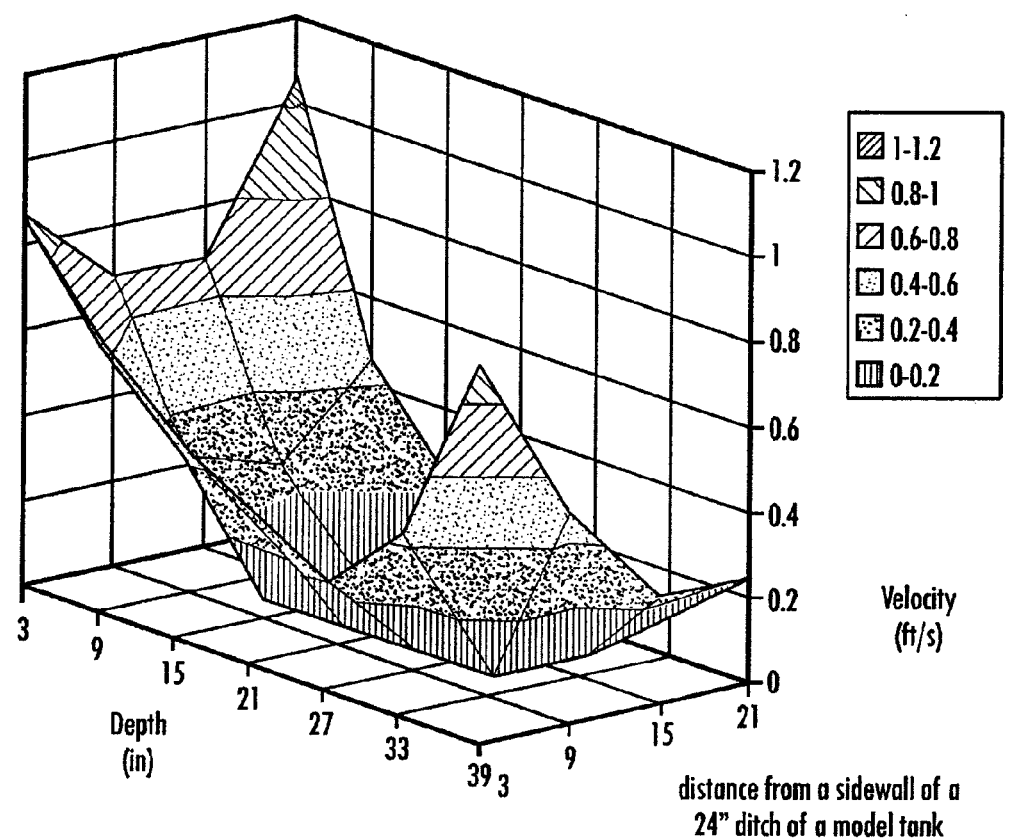
FIGS. 12A and 12B are charts that illustrate test velocity profiles of a scaled embodiment of a conventional system, showing the results for a typical Eimco aerator/mixer present invention having a rotatable surface aerator connected to a driven shaft and a rotatable submerged mixer rotor. The distance from the wall is the distance from a sidewall of a model orbital tank having a 24 inch wide channel with a water depth of 42 inches.
Figure 12B:
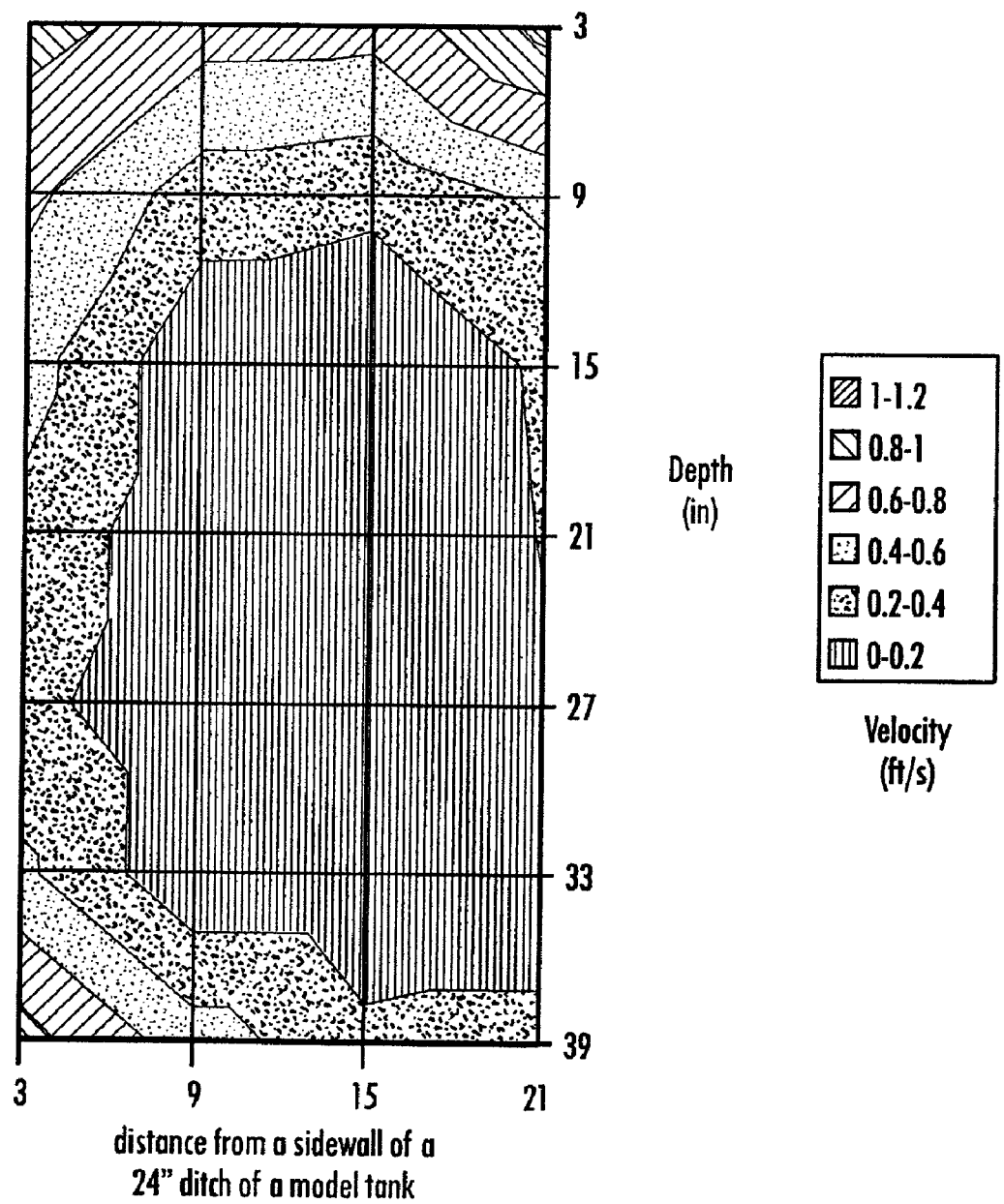

FIG. 10 shows the time it took each scaled aeration device to complete aerate water is a test orbital tank. The vertical scale is mg/L of Oxygen in water and the horizontal axis is time data points at 6 second intervals. As noted in the chart, the system of the present invention more efficiently aerated the liquid in the test tank.

Uniform ditch water velocity is important in deep ditch applications. Tests of the exemplified systems were conducted in which the DHV/Eimco aerator with the lower mixer and the surface aerator and draft tube combination of the present invention were both run in the 1/10 scale orbital test tank at a water depth of 42 inches (which is a scaled depth of about 10 meters). Both devices were run to put substantially equal power into the orbital test tank. Water velocities were recorded on a grid cross-section of the channel or ditch of the orbital test tank. Results of the test are illustrated in FIGS. 11A-12B. For substantially equal power, the system of the present invention was over 2 times more efficient in moving water around the ditch of the orbital tank. The average velocity of the system of the present invention was about 0.80 fps versus about 0.34 fps for the DHV/Eimco aerator. Further, the system of the present invention had a velocity variation from average of about 85% as compared to the velocity variation of the DHV/Eimco aerator of about 297%.

| PRESENT INVENTION VELOCITY (FT/SEC) MODEL RESULTS | | | | |
| --- | --- | --- | --- | --- |
| (in) | 3 | 9 | 15 | 21 |
| 3 | 0.80 | 0.68 | 0.81 | 0.95 |
| 9 | 0.52 | 0.60 | 0.73 | 0.95 |
| 15 | 0.80 | 0.69 | 0.72 | 0.79 |
| 21 | 1.18 | 0.74 | 0.81 | 0.78 |
| 27 | 1.26 | 0.89 | 0.89 | 0.79 |
| 33 | 1.10 | 0.63 | 0.70 | 0.75 |
| 39 | 0.81 | 0.53 | 0.69 | 0.73 |

| DVH/Eimco System VELOCITY (FT/SEC) MODEL RESULTS | | | | |
| --- | --- | --- | --- | --- |
| (in) | 3 | 9 | 15 | 21 |
| 3 | 0.88 | 0.69 | 0.68 | 1.06 |
| 9 | 0.65 | 0.31 | 0.25 | 0.45 |
| 15 | 0.48 | 0.05 | 0.05 | 0.23 |
| 21 | 0.35 | 0.05 | 0.05 | 0.21 |
| 27 | 0.26 | 0.05 | 0.05 | 0.18 |
| 33 | 0.44 | 0.05 | 0.05 | 0.10 |
| 39 | 0.90 | 0.50 | 0.25 | 0.25 |

Oxygen transfer was evaluated using the ASCE clean water test procedures and liquid pumpage was determined using a velocity meter. A summary of the test results are shown in the following table.

| SUMMARY EXPERIMENTAL RESULTS | | |
| --- | --- | --- |
| PARAMETERS | DVH/Eimco SYSTEM MODEL | INVENTIVE SYSTEM MODEL |
| RPM | 450 | 445 |
| $HP_{WATER}$ | 0.51 | 0.52 |
| $K_L a_{20}$, $hr^{-1}$ | 9.56 | 13.8 |
| SOTR, $lbO_2$/HR | 0.47 | 0.69 |
| Avg. Velocity, ft/sec | 0.34 | 0.80 |

As noted above, it can be concluded from the test results that the design of the system of the present invention is significantly more efficient in both liquid pumpage and oxygen transfer. In addition, it should be noted that the system of the present invention produced a significantly more uniform velocity profile in both width and depth of the entire tank or basin when compared to the conventional DVH/Eimco design.

The preceding description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Other embodiments of the invention will be apparent to those skilled in the art from consideration of the specification and practice of the invention disclosed herein. Thus, the preceding description is provided as illustrative of the principles of the present invention and not in limitation thereof. It is intended that the specification and examples be considered as exemplary only, with a true scope and spirit of the invention being indicated by the following claims.

What is claimed is:

1. A system for aerating a liquid, comprising:
   a tank having a bottom, wherein the tank holds a volume of the liquid;
   a first driven rotative shaft having a longitudinal axis, wherein at least a portion of the shaft extends into the liquid;
   a rotatable surface aerator mounted to the first driven rotative shaft and at least partially immersible into the liquid, wherein the surface aerator is adapted to rotate about the longitudinal axis of the first driven rotative shaft to move the liquid upward and distribute it over the liquid surface; and
   an elongate draft tube having a longitudinal axis, a proximal end and a distal end, the draft tube being mountable to the first driven rotative shaft and rotatable about the longitudinal axis of the first driven rotative shaft, wherein the longitudinal axis of the draft tube is substantially co-axial with the longitudinal axis of the first driven rotative shaft; wherein the proximal end of the draft tube underlies the surface aerator, and wherein the distal end of the draft tube is positioned a predetermined distance from the bottom of the tank.

2. The system of claim 1, wherein the proximal end of the draft tube is positioned adjacent a bottom portion of the surface aerator.

3. The system of claim 1, wherein the proximal end of the draft tube is spaced a predetermined distance from a bottom portion of the surface aerator.

4. The system of claim 1, wherein the draft tube is a substantially cylindrical tube.

5. The system of claim 4, further comprising an insert mountable in the distal end of the draft tube, the insert defining a central opening that has a diameter that is less than the diameter of the proximal end of the draft tube.

6. The system of claim 1, wherein the diameter of the proximal end of the draft tube is greater than the diameter of the distal end of the draft tube.

7. The system of claim 6, wherein the draft tube has a frustoconical shape.

8. The system of claim 1, wherein the diameter of the surface aerator is at least equal to the diameter of the proximal end of the draft tube.

9. The system of claim 1, further comprising a plurality of impeller blades mountable to an interior surface of the draft tube for moving liquid up the draft tube toward the surface aerator.

10. The system of claim 1, further comprising:
    a second driven rotative shaft having a longitudinal axis, wherein the second driven rotative shaft is positioned therein the elongate draft tube; and
    a submerged rotor mounted to the second driven rotative shaft for moving liquid up the draft tube toward the surface aerator,
wherein the second driven rotative shaft is rotated at a speed at least equal to the rotation speed of the first driven rotative shaft.

11. The system of claim 1, further comprising a source of gas; wherein the lower portion of the first driven rotative shaft is positioned within the draft tube, wherein the first driven rotative shaft defines a bore in communication with at least one aperture in the lower portion of the first driven rotative shaft, and wherein the bore is in communication with the source of gas such that the gas is injected into the fluid within the draft tube via the at least one aperture.

12. The system of claim 1, wherein the tank is an orbital tank having at least one partition wall extending short of a tank curved turning wall to form at least a pair of channels for movement of the volume of liquid.

13. The system of claim 12, further comprising a drive unit positioned above the liquid surface and between an end of one of the at least one the partition wall and a tank curved turning wall, wherein the drive unit is coupled to the first driven rotative shaft.

14. The system of claim 12, wherein the draft tube is spaced less than about 10 inches from the partition wall.

15. The system of claim 12, wherein the longitudinal axis of the draft tube extends substantially parallel to the partition wall.

* * * * *